(12) United States Patent
Bergey

(10) Patent No.: US 6,561,580 B1
(45) Date of Patent: May 13, 2003

(54) ENERGY-ABSORBING AIRCRAFT SEAT

(76) Inventor: Karl H. Bergey, Rte. 1, Box 151B, Norman, OK (US) 73072

( * ) Notice: Subject to any disclaimer, the term of this patent is extended or adjusted under 35 U.S.C. 154(b) by 0 days.

(21) Appl. No.: 09/489,465

(22) Filed: Jan. 21, 2000

Related U.S. Application Data

(60) Provisional application No. 60/116,822, filed on Jan. 21, 1999.

(51) Int. Cl.⁷ .................................................. B60N 2/42
(52) U.S. Cl. .............................. 297/216.1; 297/452.13; 297/452.56
(58) Field of Search ........................ 297/216.1, 452.24, 297/452.13, 452.52, 452.56, 452.53, 452.57

(56) References Cited

U.S. PATENT DOCUMENTS

| | | | |
|---|---|---|---|
| 2,803,293 A | * 8/1957 | Rowland | 297/452.52 |
| 3,165,356 A | * 1/1965 | Geier et al. | 297/216.1 |
| 3,264,034 A | * 8/1966 | Lawson | 297/452.52 X |
| 3,586,131 A | 6/1971 | Le Mire | |
| 3,612,223 A | 10/1971 | Shiomi et al. | |
| 3,767,261 A | * 10/1973 | Rowland | 297/452.52 |
| 4,060,278 A | 11/1977 | Maeyerspeer | |
| 4,423,848 A | 1/1984 | Mazelsky | |
| 5,338,090 A | 8/1994 | Simpson et al. | |
| 5,499,783 A | 3/1996 | Marechal | |
| 5,700,545 A | 12/1997 | Audi et al. | |
| 5,747,140 A | * 5/1998 | Heerklotz | 297/452.52 |
| 6,017,084 A | * 1/2000 | Carroll, III et al. | 296/189 |
| 6,199,942 B1 | * 3/2001 | Carroll, III et al. | 296/189 |

OTHER PUBLICATIONS

Van Gowdy, "Development of a Crashworthy Seat for Commuter Aircraft,," Technical Report No. DOT/FAA/AM–90/11, FAA Civil Aeromedical Institute, P. O. Box 25082, Oklahoma City, OK 73125, Sep. 1990.

* cited by examiner

*Primary Examiner*—Anthony D. Barfield
(74) *Attorney, Agent, or Firm*—James F. Harvey, III

(57) ABSTRACT

A energy absorbing structure is disclosed for the purpose of protecting human occupants of a vehicle from the damaging effects of sudden accelerative or decelerative forces by means of plastic deformation of the structure. The structure consists of a generally rectangular sheet of a stranded material, preferably expanded metal, which has nonisotropic properties and which is employed in the construction of the bottom or back of a seating structure for the vehicle occupant. The nonisotropic properties of the sheet allow it to be designed in such a way that it resists deformation when exposed to any force below a specified threshold; beyond the specified threshold, the sheet absorbs the force through plastic deformation, thus attenuating damaging force to which the occupant may be exposed. Such a device may be used in the seating apparatus of various vehicles, including aircraft, automobiles, space vehicles, helicopters, heavy machinery, tractors, military vehicles, and the like.

20 Claims, 5 Drawing Sheets

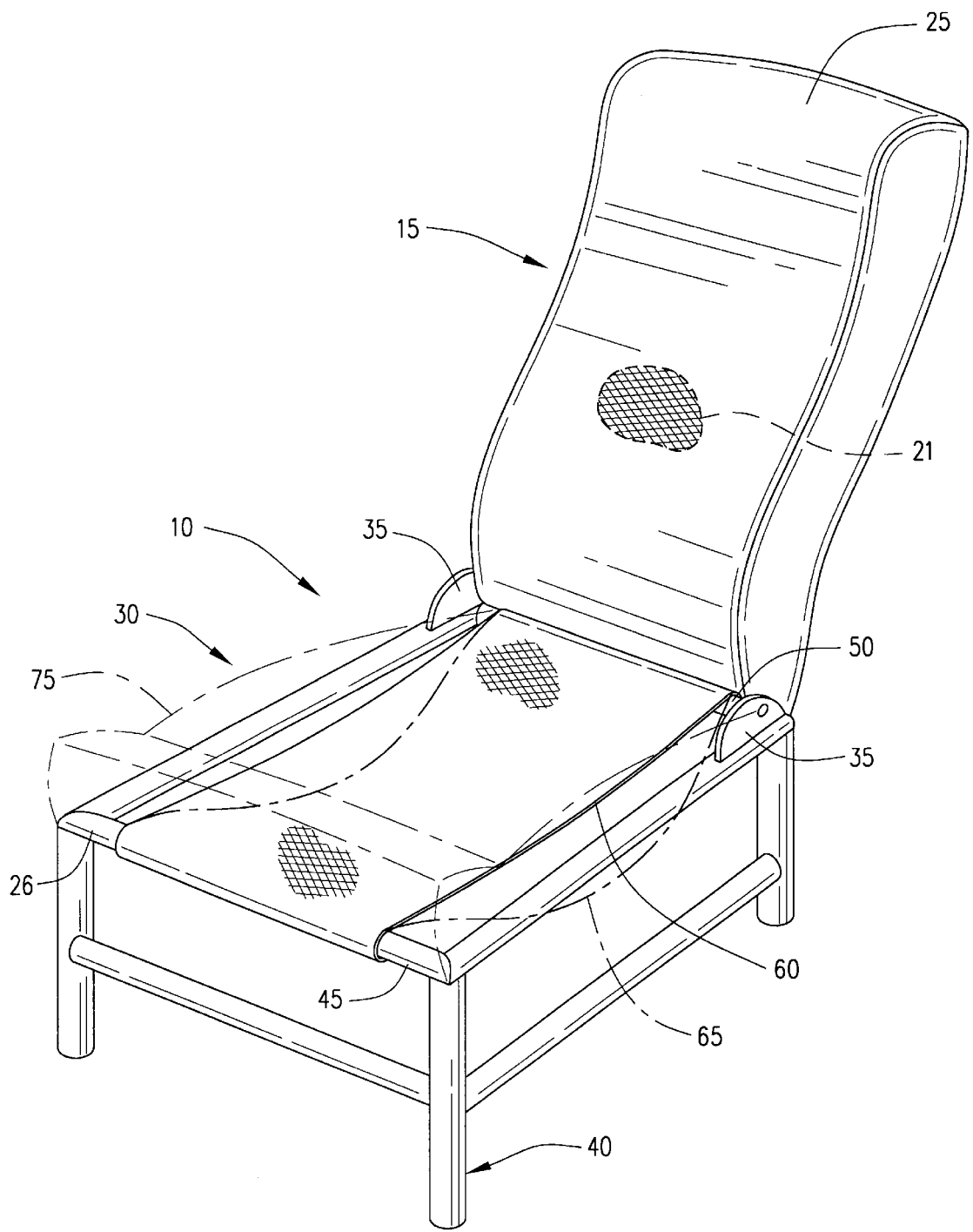
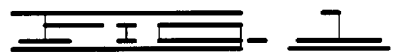

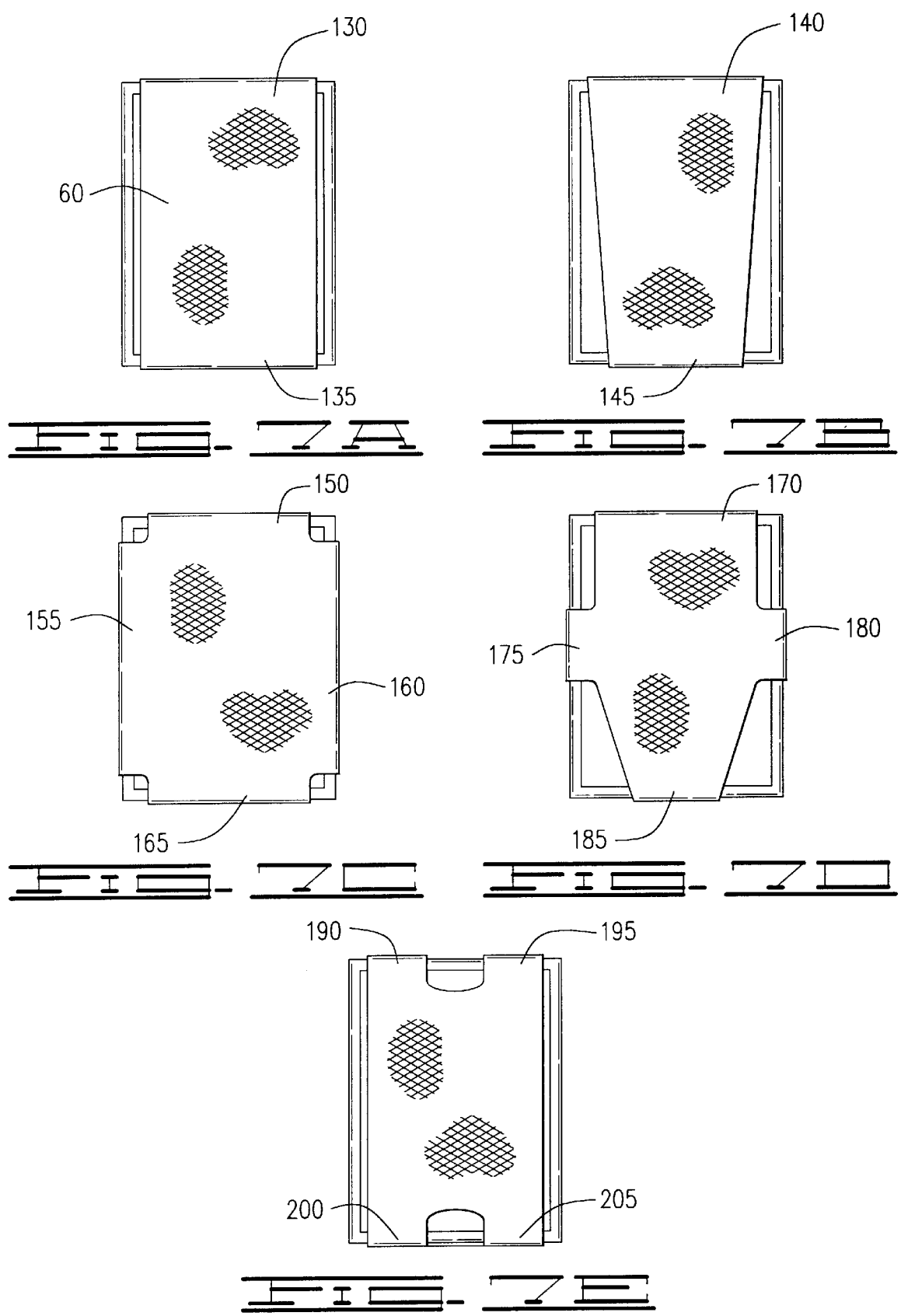

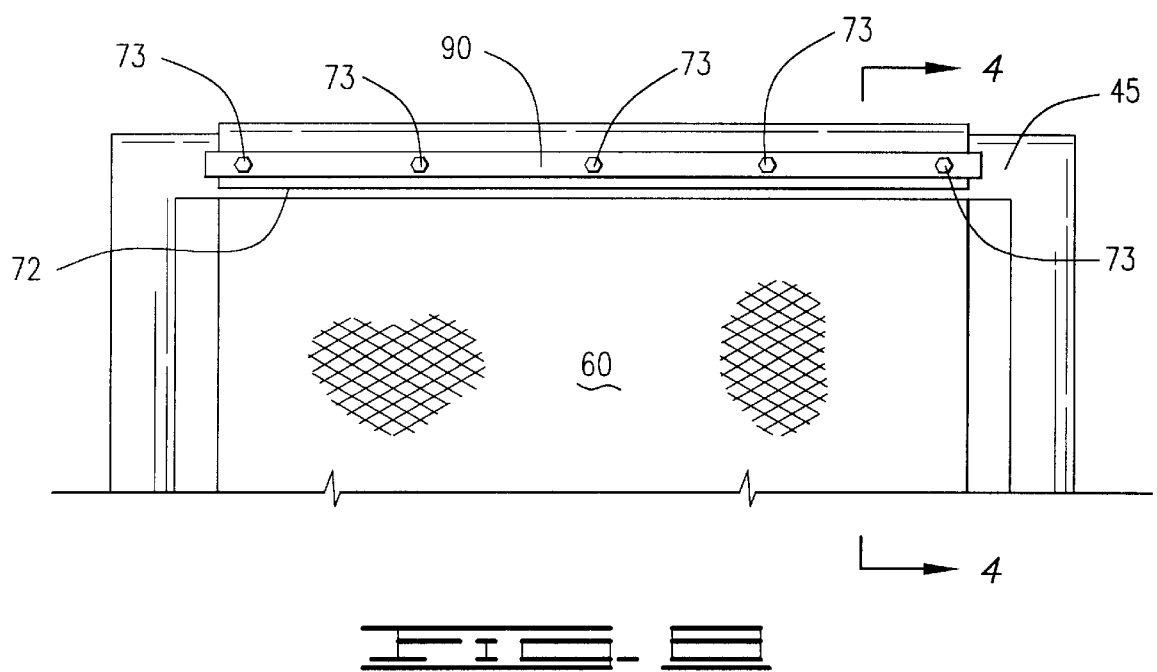
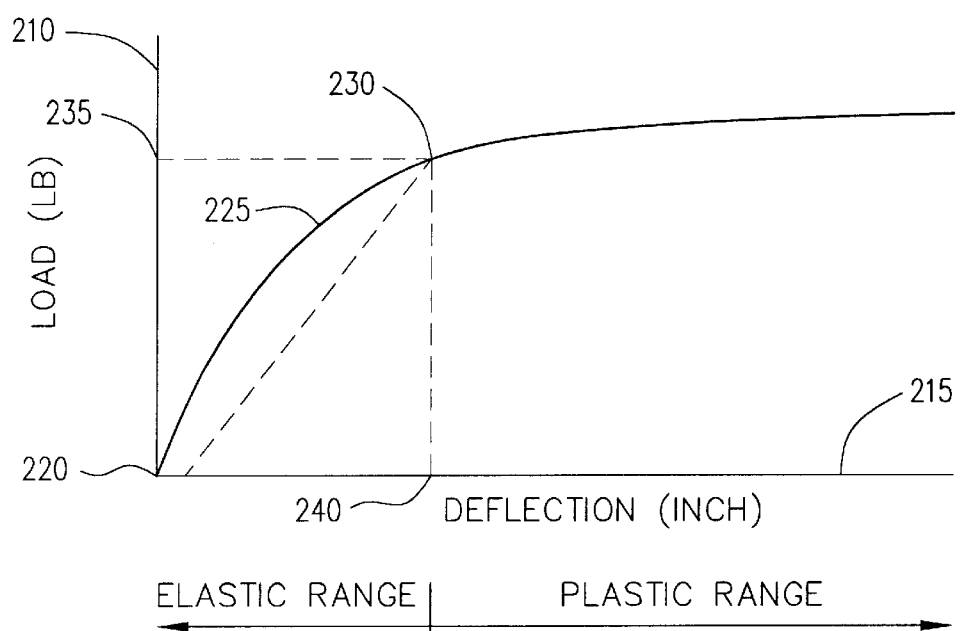
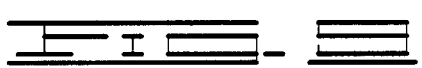

ENERGY-ABSORBING AIRCRAFT SEAT

CROSS-REFERENCES TO RELATED APPLICATIONS

This patent application claims priority based upon the following provisional patent application: Ser. No. 60/116,822, filed on Jan. 21, 1999, of the same or similar title.

STATEMENT AS TO RIGHTS TO INVENTIONS MADE UNDER FEDERALLY SPONSORED RESEARCH AND DEVELOPMENT

This invention was made under the auspices of Bergey Aerospace, Inc. No rights will accrue to any other entity, either governmental, educational, or commercial.

BACKGROUND

A. Field of the Invention

The present invention relates generally to shock-absorbing structures, more particularly, to safety features incorporated into vehicle seats, namely those found in aircraft, to protect the occupant, insofar as it is possible, from shock induced injury. Such structures find utility in related fields such as automotive, machinery, or any vehicle having human occupants.

B. Description of the Related Art

Designers of vehicles have strived for many years to provide safety devices designed to protect the vehicle occupants from injury in the event of a mishap. Such vehicles include land based vehicles such as automobiles, trucks, earth moving equipment, and the like; sea based vehicles such as boats and submarines; and flying vehicles such as aircraft, helicopters, and spacecraft. All such vehicles feature a to compartment in which the occupants, consisting of the operator and passengers, are seated and surrounded by instrumentation and apparatus for controlling the vehicle. Because the vehicle is generally in motion, external forces may cause the compartment to abruptly change its direction of motion, resulting in forces exerted upon the occupant. If such forces are too great, the occupant can be seriously injured or killed from these forces.

Various means have been proposed to protect the occupant from such forces. Seat belts are a notable example of such protection. They prevent the occupant from being thrown out of the seat and against the instrumentation, control apparatus, or the boundaries of the occupant's compartment, thus injuring the occupant. However, the seat belt is generally inelastic; that is, when the occupant is abruptly thrown against the seat belt, the force is absorbed by the human body against the seat belt. If the force is too great, then the human body is unable to dissipate the force by its natural elasticity and the tissue or bones will break down, resulting in injury. Some inventors have made an effort to dissipate the force by adding an elastic component to the seat belt which permits the belt to expand somewhat. For example, U.S. Pat. No. 4,060,276, by Maeyerspeer, achieves such elasticity by adding slots in the belt which allow the belt to tear when presented with a specified force to thus absorb the energy of the force.

Other devices protect the occupant by deforming when the occupant is forced against the device. Thus, while seat belts prevent the occupant from being thrown out of the seat, they do nothing to protect the occupant from vertical components of the impact forces such as those commonly experienced in airplane or helicopter accidents. Given that the occupant is in a normal seated position, such forces might be caused by a vertical fall ending in a sudden stop. Cushions, springs, and hydraulic shock absorbers, all installed in the base of the seat, have historically been used to dissipate such sudden and short duration forces. Some of devices exhibit the tendency to return to the original configuration after dissipating the force, resulting in an equal and opposite reaction and allowing the device to resume its shock-absorbing function at a later time.

Le Mire (U.S. Pat. No. 3,586,131) teaches the use of a mechanical energy absorbing device permitting absorbing a thrust by plastic deformation. The device consists of a metal plate having a central fastening point and a plurality of lateral-fastening points. The metal plate has staggered arcuate apertures concentrically arranged around a single centrally-located fastening point so that the plate can expand in tension when subjected to a load tending to move the central fastening point away from at least one of the lateral-fastening points. This device is designed to deform equally in all directions and is thus believed to exhibit isotropic characteristics under load. Le Mire teaches its use for securing or coupling automotive parts likely to be moved or struck by the passengers of a vehicle in case of a violent mishap.

Simpson et. al. (U.S. Pat. No. 5,338,090, Aug. 16, 1994) features a leg structure in a seat frame which deforms to absorb energy. Marechal (U.S. Pat. No. 5,499,783, Mar. 19, 1996) describes device in which energy is dissipated by having a male part which penetrates by force and with plastic deformation into an aperture of a female part, where both parts are components of an underframe for a passenger aircraft seat.

Audi et. al. (U.S. Pat. No. 5,700,545, Dec. 23, 1997) describes an energy absorption device using an expanded metal structure sandwiched between an incident surface and a basal surface, wherein the expanded metal structure is oriented substantially perpendicular to the incident surface. This device is designed so that a force striking an incident surface will cause the expanded metal structure to collapse through plastic deformation during energy absorption so that damage to the object protected by the basal surface is prevented. It is interesting to note that the ends of the strands in this structure are unconstrained, which means that an impacting object deforms the strands in compression rather than in tension, which further facilitates collapse of the structure. The inventors teach the use of this structure for head rests, arresting gear, landing gear, but not for seating arrangements.

Aircraft present unique problems in the design of energy-absorbing structures such as seats. First, weight must be kept to a minimum so that the aircraft may be efficiently operated. Cushions, springs, energy attenuation devices, and hydraulic shock absorbers all have a certain non-trivial and adverse weight and space effects that detract from the utility of the aircraft and other vehicles, thus requiring adverse design tradeoffs that may reduce efficiency of the aircraft. Second, Title 14 of the Code of Federal Regulations, which governs aircraft certification, requires dynamic seat tests, to check the ability of the seat to prevent injury to the occupant when the seat is exposed to associated forces with specified deceleration rates. Cushions, springs, hydraulic shock absorbers, or complex seating frames which deform on impact, most of which operate through compression upon loading, must be substantially constructed in order to provide the necessary protection to the occupant; the resulting construction enhancements and considerations invariably result in increased weight.

Thus, it would be desirable to find an efficient and economical means of seat construction for aircraft and helicopters that will accomplish the following:

1. Support the occupant of an aircraft seat comfortably and without permanent deformation during all normal operations within the approved structural envelope of the aircraft.
2. Absorb energy and thereby attenuate the decelerative forces imposed on the occupant at the deceleration rates and loading angles specified by law and regulation (i.e. the Code of Federal Regulations, Title 14) or in other formal or informal requirements for occupant safety and protection.
3. Exhibit flexibility in configuration so that the point at which plastic deformation occurs can be controlled.
4. Have low weight for aircraft use.
5. Be inexpensive to construct and maintain.

Such considerations as low weight, flexibility in configuration, and energy absorption, and expense would also have utility in seat construction for vehicles other than aircraft and helicopters.

SUMMARY

It is therefore an object of the present invention to provide ab energy-absorbing structure which will absorb shock forces experienced by a human being in a seated position within an airborne vehicle.

Another object of the invention is to provide an energy absorbing structure which is light weight.

Another object of the invention is to provide a means of absorbing said shock without the accompanying rebound exhibited by certain conventional energy-absorbing designs.

Another object of the invention is to provide an energy absorbing structure which absorbs forces impacting the structure primarily by means of loading the structure in tension rather than loading the structure in compression.

Another object of the invention is to provide a simple and lightweight energy-absorbing structure which will meet the certification requirements of the United States Federal Aviation Agency as documented in Part 23 of Title 14 of the Code of Federal Regulations or other requirements that may be promulgated by the United States Government from time to time.

Another object of the invention is to provide an energy absorbing structure which is easily constructed from materials well known to the aviation industry.

Another object of the invention is to provide an energy absorbing structure which is relatively inexpensive to build and maintain, as compared with the existing art.

Another object of the invention is to provide an energy absorbing structure which can be supported by a rigid supporting means.

These objects of the invention are achieved by a special seat pan supported by a seating means which provides a space in which the seat pan can expand when subjected to a load normal (i.e., perpendicular) to the incident surface of the seat pan. In the case of an aircraft seat, the seating means provides the structural interface between the seat pan and the cabin structure of the aircraft. The seat pan is formed from a stranded structure which is formed from etched, cast, joined, mechanically perforated, or other forming processes, such structure being formed so as to exhibit nonisotropic characteristics. The best embodiment in this application is an expanded metal structure where the metal has been slit and partially expanded in a manner which will permit the sheet to expand when deformed by a rigid body, namely the body of the occupant when that body is subjected to forces against the seat pan. The slits in the seat pan are designed to deform plastically and permanently under shock loads, so that the seat pan as a unit expands with the force when such loads exceed a given, predetermined limit. This limiting point beyond which plastic deformation occurs is determined by a number of design factors, such as the two-dimensional shape of the seat pan, the manner in which it is supported at its perimeter, the orientation of the apertures in the expanded metal with relationship to the supporting points, the material from which the seat pan is made, and the dimension and shape of the apertures in the seat pan. This plastic deformation will absorb energy and reduce the decelerative forces acting on the occupant of the seat without the reactive component which would tend to return the seat pan to its unexpanded configuration. Such a seat pan is manufactured from light weight materials. Since it replaces a normal component of the seating structure, it does not occupy excessive space or add materially to the weight of the seat structure. The seat pan may optionally be covered with a soft, resilient pad made of such materials as polyurethane, rubber, or cloth materials, in order to increase comfort for the occupant and to more evenly spread the load subjected to the seat pan.

Prior seat designs achieve their energy-absorbing characteristics through plastic deformation of the seat supporting means, whereas the invention described in this disclosure achieves its energy-absorbing characteristics through plastic deformation of the seat pan itself supported by a rigid supporting means. It is believed that this aspect of the invention is unique and novel.

BRIEF DESCRIPTION OF THE DRAWINGS

FIG. 1 shows a perspective view of a seating structure incorporating the invention and which is representative of the invention in general.

FIG. 6 illustrates a representative aperture formed of two strands in a typical stranded structure made of slitted metal.

FIG. 7 shows five different embodiments of the methods of constraining the strands in a shaped seat pan and providing support thereof.

FIG. 8 shows a bottom view of one embodiment of how a seat pan is supported so as to constrain the strands within the structure.

FIG. 9 shows a representative force-deflection graph illustrating the principle whereby the invention operates.

DETAILED DESCRIPTION OF THE PREFERRED EMBODIMENTS

Figure 5:
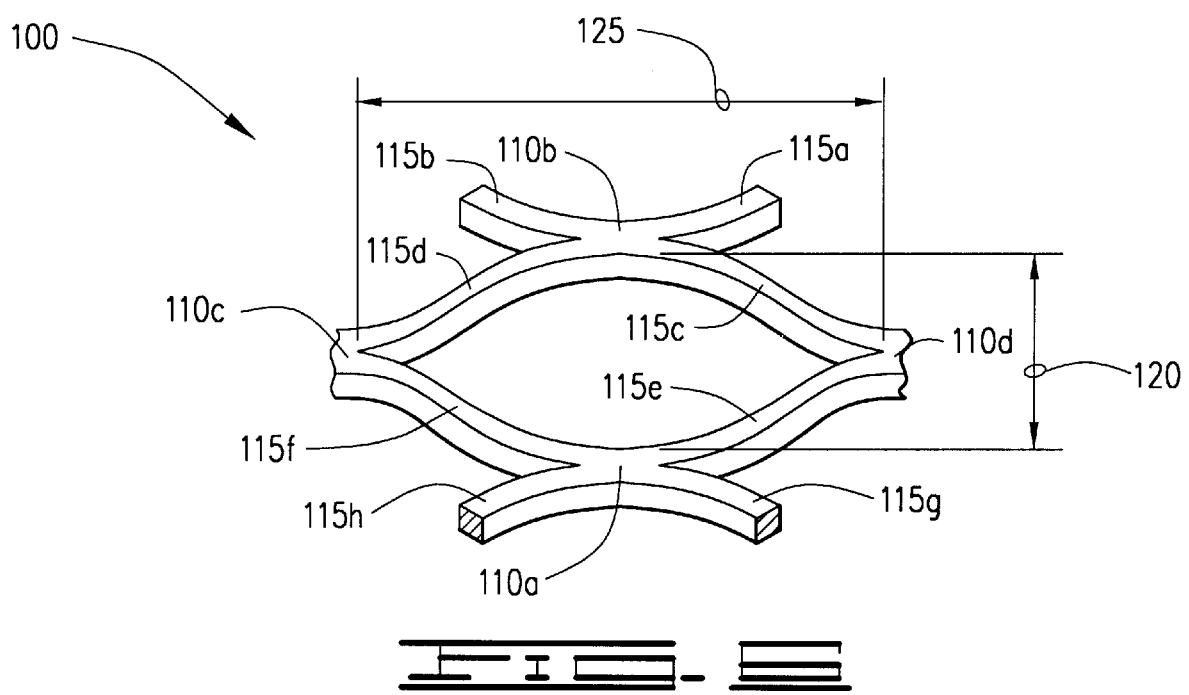
FIG. 5 is a side view of the seating structure of FIG. 1.

The invention is best understood by describing it in a typical application which is shown for illustration purposes only and is not intended to limit application of the invention. Referring to FIGS. 1 and 5, we see one such application in which the invention is employed as an aircraft seat. An aircraft seat 10 is shown, consisting of a back portion 15, a bottom portion 30, and a support means 40. Back portion 15 is rigidly connected to the bottom portion 30, although the capability of reclining back portion 15 may be built into the structure for added comfort to the occupant by pivotably connecting back portion 15 to bottom portion 30 by hinge means 35 at their juncture. Back portion 15 provides support for the occupant's back, shoulders, and head, the back portion 15 having a generally rectangular back support frame 20 constructed of tubing, webbing, springs, straps, and the like, and covered with a soft, elastic back cushion material 25 for comfort to the seat occupant. Bottom portion 30 supports the thighs and buttocks of a human torso in a seated position (not shown). Both back portion 15 and bottom portion 30 are positioned with respect to each other and supported by support means 40 which connects the aircraft seat 10 to the cabin floor 55 of the aircraft. Bottom portion 30 consists of a seat pan 60, shown with a slight curvature for comfort, and a seat cushion 75 upon which a human torso is seated. Support means 40 may be of any suitable construction which supports the back portion 15 and positions bottom portion 30 a distance from floor 55 to permit seat pan 60 to unobstructedly expand into space 80 when vertical force 85 is exerted upon a human torso seated upon the bottom portion 30. When subjected to vertical force 85, a seated human torso (not shown) is downwardly pressed against cushion 75 which transfers force 85 to seat pan 60, thereby causing seat pan 60 to expand downwardly through plastic deformation of seat pan 60 to arrive at pan position 65 as the kinetic energy of force 85 is dissipated. Seat pan 60 provides a generally horizontal base for cushion 75 which cushion is constructed of a suitable elastic material which provides a soft and comfortable interface between seat pan 60 and the human torso (not shown). Seat pan 60 is held in a horizontal orientation at its two opposing sides by front frame member 45 and rear frame member 50.

Figure 2:
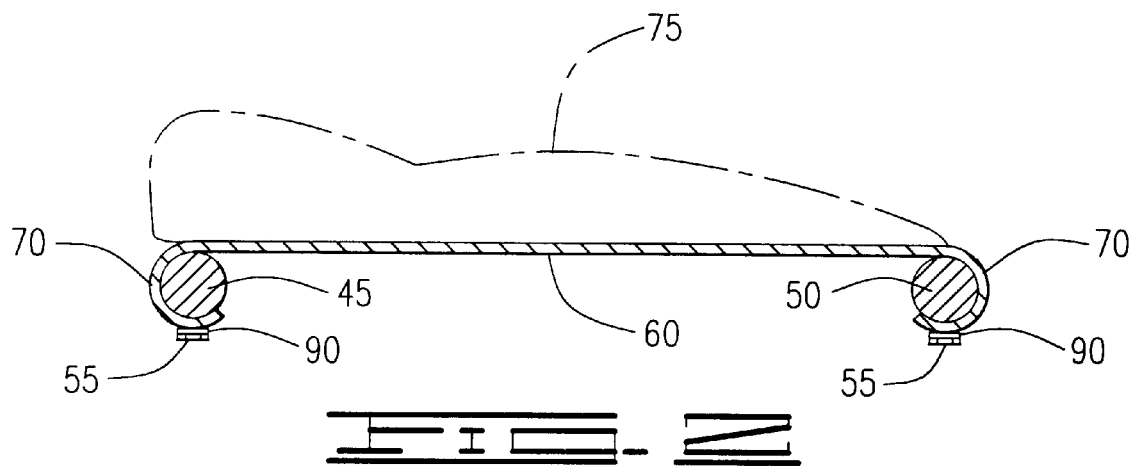
FIG. 2 shows a side view of the invention as it would normally be configured before energy absorption through plastic deformation.
Figure 3:
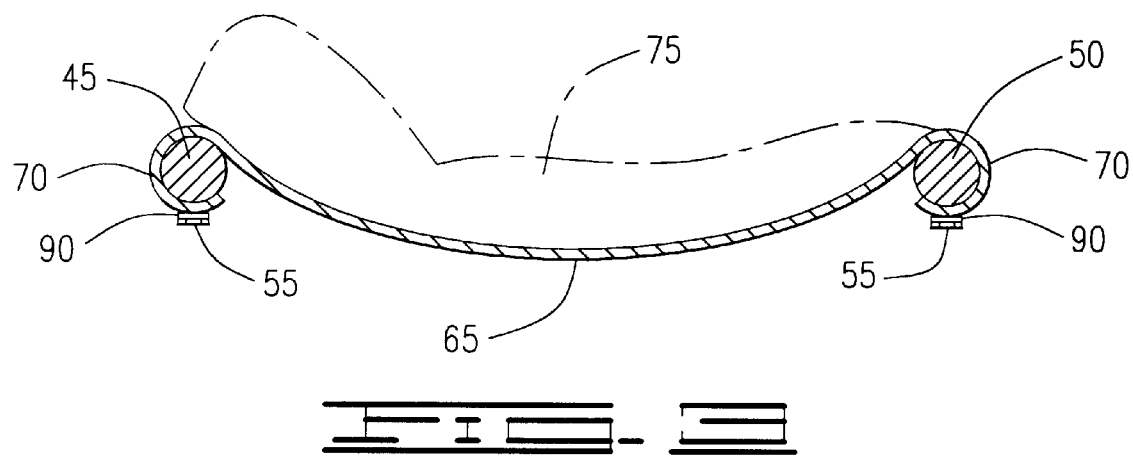
FIG. 3 depicts a side view of the invention after it has been subjected to a load which would cause the invention to plastically deform and expand into the space below.

Seat pan 60 is secured to frame members 45 and 50 by partially wrapping the material of seat pan 60 around said frame members and securing the material from the bottom side, as best shown in FIGS. 2 and 3. Bight 70 is formed in each of two opposing sides of seat pan 60 for capturing a frame members 45 and 50 therein, so that the material of seat pan 60 is in contact with a generally semicircular portion of frame members 45 and 50. As best seen in detail in FIG. 5, bight 70 is secured to a frame member from the underside by means of a rectangular bar 90 which captures the leading edge 72 of seat pan 60 between it and frame member 45, 50 and frictionally holds the seat pan therebetween. A plurality of screws 55 inserted through rectangular bar 90 and into threaded holes in respective frame member 45, 50 are tightened so as to maintain rectangular bar 90 in frictional contact with both leading edge 72 and the respective frame member 45 or 50. The degree of frictional contact may be adjusted in this manner so that a sufficient force 85 (FIG. 5) exerted upon seat pan 60 will cause the side to slightly travel back around frame members 45, 50, thus augmenting the energy-absorbing capability of seat pan 60. This manner of securing seat pan 60 to frame members 45, 50 has the advantage that all points along the leading edge 72 of seat pan 60 can be simultaneously be constrained by bar 70 with an adjustable, uniform pressure. However, this is but one embodiment, and seat pan 60 may also be rigidly secured by welding, rivets, flanged screws, bolts, springs, or any similar means without departing from the scope of the invention.

The support means 40 is shown in FIG. 1 as a generally rectangular frame with tubular members, primarily for illustration of the energy absorbing concept of the invention. However, any method may be used to support seat pan 60 a distance from the nearest surface so that it may freely expand into the space therebetween. In small aircraft, portions of the aircraft structure may perform double duty both as structural components and as an anchoring point for one or more sides of seat pan 60. For example, in small aircraft, the main wing spar runs through the cabin and may be utilized as one of the supporting members of the rectangular frame. Similarly, the side wall of the aircraft cabin may provide a means for anchoring one side of seat pan 60. Also, members having cross sections other than circular may be used to suitable construct support means 40. If a generally rectangular frame composed of elongate members is used, then embodiments of frame members other than those illustrated as 45, 50 may be used; for example, frame members having triangular, rectangular, or elliptical cross-sectional shapes may also be used without departing from the scope of the invention, provided that they are suitable for the particular purpose of providing support for the seat 10.

Support means 40 has been heretofore described as being a rigid structure, but this should not preclude the use of other energy absorbing seating frames described in the prior art and in conjunction with the present invention. A distinction should be made here between a "rigid" support means and "rigid" support of the seat pan. The former phrase refers to the fact that energy-absorption is primarily being accomplished by the seat-pan and not the support means, whereas the latter phrase refers to fact that the seat pan is kept in the same relative relationship with the support means and the surface beneath the seat pan. As will be presently explained, the latter term also refers to the constraint of strands in the expanded metal composition of the seat pan at the supporting points so they are placed in tension by force 85.

The design and construction of seat pan 60 involves a multiplicity of factors in order to provide an apparatus with desired shock-absorbing characteristics, which are described in a load-deflection graph having a typical aspect as given in FIG. 9. Here the magnitude of force 85 (FIG. 5) is given in pounds on the vertical axis 210 and the deflection in inches of seat pan 60 as it is deflected by force 85 to position 65 is given by the horizontal axis 215. Loads less than value 235 will result in an elastic deflection of the seat pan; the seat pan will elastically return to its rest state when the load is removed. The range of deflection for such loads is called the elastic range. However, for loads exceeding value 235, the seat pan will deflect plastically and permanently and will not return to its rest state when the load is removed. The design task for a suitable seat pan is to configure the seat pan for a selected threshold value 235 and a selected deflection value 240 which may be accommodated by the space 80.

The structure considered for use in the seat pan 60 of the present invention and considered to be the best embodiment is a sheet of slitted metal which has been formed by piercing the metal with parallel rows of alternating slits and then partially expanding the sheet so that the slits form hexagonal-shaped openings, or apertures 100, in the sheet, as indicated in FIG. 6. The same slitted metal material 21 used for seat pan 60 could optionally be used in back frame 20. The slitted metal material for seat pan 60 exhibits nonisotropic properties. The term nonisotropic is well-known in the art of materials science and, as used herein, describes a characteristic of a material whereby the properties it exhibits in a first direction of orientation differ from the properties it exhibits in a second direction. The second direction is most commonly oriented perpendicular, or normal, to its first direction. The nonisotropic property of slitted metal results from the choice of metal alloy; the expanded pattern in which the material is physically manufactured, constructed, or configured; the degree of expansion of the material; the orientation of each aperture of the material with respect to how the seat pan is supported; and the number of layers of such material.

A typical aperture 100 in a sheet of expanded metal is shown in FIG. 6. Aperture 100 is formed of two parallel strands 115c, 115d and 115e, 115f which are periodically joined to adjacent strands at a bond 110a or 110b, and with each other at bonds 110c or 110d. Aperture 100 is seen to have two axes, a long way of opening 125 which is colinear with the slits and a short way of opening 120 which is perpendicular to the slits. As shown, strands 115c, 115d and 115e, 115f run horizontally. When the ends of said strands are fixed in place at the perimeter of seat pan 60 and a force 85 applies load to the seat pan, then aperture 100 tends to close, i.e. the short way of opening 120 becomes smaller and the long way of opening 125 becomes longer. Note, however, that cross strands may be conceptualized running vertically through the structure. As shown in FIG. 6, such a cross strand might be formed of segments 115b, 115d, 115f, 115h or of segments 115a, 115c, 115e, 115g. If the ends of a cross strand are fixed in place at the perimeter of seat pan 60 and a force 85 applies load to the seat pan, then aperture 100 tends to become more opened, i.e. the short way of opening 120 becomes longer and the long way of opening 125 becomes smaller. In either event, the strands and cross strands, each having their ends constrained, are placed in tension by an applied load. The interplay between strands and cross strands is not completely understood and can become quite complex depending upon the way in which these strands and cross strands are constrained at the perimeter of the seat pan by supporting means 40.

As illustrated in FIGS. 1, 2, 3, 5, and 8, seat pan 60 is shown having support by supporting means 40 at two opposed sides along its perimeter. However, other methods of supporting seat pan 60 (and thus constraining selected strands and cross strands) may be used depending upon the desired expansion characteristics required to provide a given quality of energy absorption. FIGS. 7a through 7e show a number of different support methods, depending upon the shape of seat pan 60.

FIGS. 7a and 7b show two different methods by which seat pan 60 having a rectangular shape is supported by a single support along two opposed sides. Note in FIG. 7a that the expanded material comprising seat pan 60 may be oriented either with the long way of opening in the direction from support 130 to support 135 or the short way of opening in the direction from support 130 to support 135; the load-deflection curve of each orientation is radically different.

FIGS. 7c and 7d show two different support methods by which a seat pan has four points of support, one on each of its four sides. The seat pan in FIG. 7c is supported at 150, 155, 160, and 165, and the seat pan in FIG. 7d is supported at 170, 175, 180, and 185. However, the lengths of the sides in FIG. 7d differ from those in FIG. 7c. Again, the apertures of the seat pan in FIG. 7c can be oriented so that either the long way of opening or the short way of opening is in a direction from support 150 to support 165. The same general rule holds true for FIG. 7d.

FIG. 7e depicts a support scheme whereby two supports are provided along each of two opposed sides, again providing four points of support identified by 190, 195, 200, and 205.

The material chosen for the expanded metal sheet of a seat pan and considered to the best embodiment for use in seating applications is an aluminum or steel alloy with sufficient elongation prior to failure to allow a high degree of plastic deformation. In this application both aluminum and steel alloys have the desirable properties of light weight, ease of forming, sufficient strength to support desired loads, low cost, and fire resistance. These properties make the material useful in seating applications involving aircraft, helicopters, and automobiles.

Any seating apparatus for use in aviation applications must meet certain standards under the current regulations (Title 14 of the Code of Federal Regulations, or 14 CFR.) governing the United States Federal Aviation Administration (FAA). In particular, Part 23 of the FAA regulations requires that the seat design must be capable of surviving an impact of not less than 32 feet per second at 60 degrees positive pitch while peak deceleration must be at least 19 g and within 0.05 seconds after impact. A seating design employing a seat pan manufactured according to the principles herein described can be configured, as shall be presently be seen, such that it plastically deforms so as to absorb the indicated load but at lower values it elastically keeps its shape and configuration. The range of deflection for a nonisotropic material is determined by the orientation of the applied load. The configuration of the seat pan is chosen so that it returns elastically to its normal shape for loads within the normal operating range of the vehicle and plastically deforms for values in the plastic range for loads greater than the normal operating range, the seat pan deforms plastically, thereby absorbing energy and reducing the load applied to the occupant. It was found during testing that the energy-absorbing characteristics of the seat pan could be empirically tailored to specific requirements by varying (1) the composition of the material, (2) the thickness of the material, (3) the shape of the apertures, (4) the orientation of the apertures, (5) the method of attachment of the seat pan to the support means, and (6) the shape of the seat pan.

In a test case, an energy absorbing seat pan was designed and fabricated with the proper selection of material and a shape, as described in this disclosure, to meet the impact attenuation requirements given above. By extension, the design parameters can be selected to meet a wide variety of occupant protection requirements.

Figure 4:
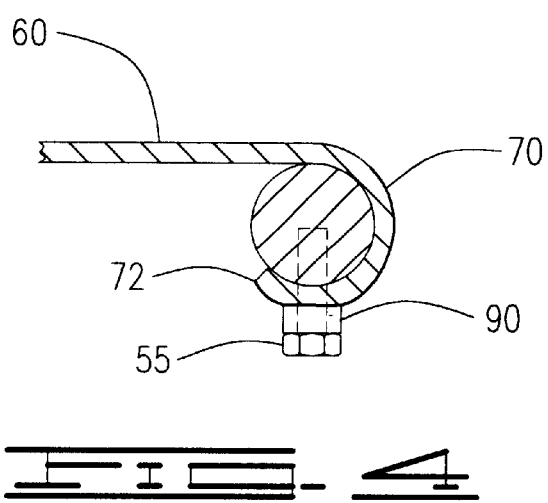
FIG. 4 shows a detailed view of one embodiment of how the invention is connected to seating means.
Figure 4:
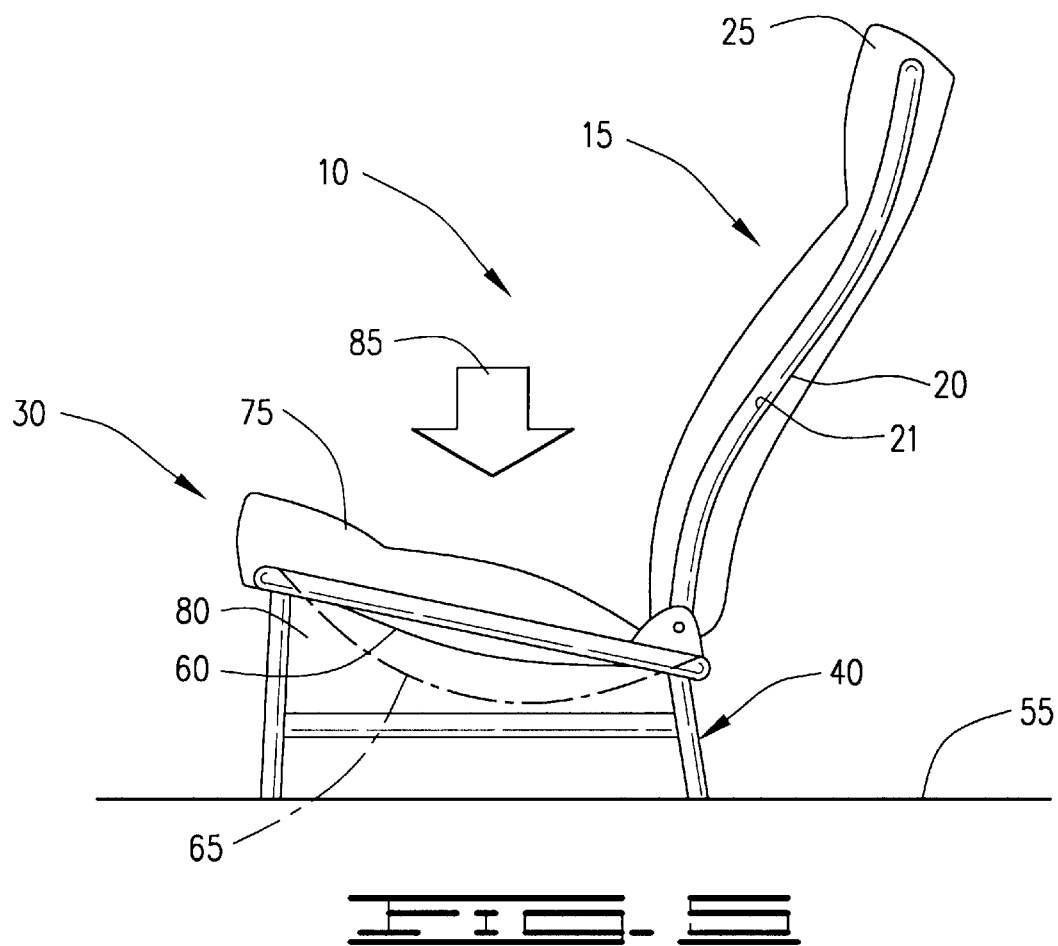

Seat pans with various combinations of pan material, pan shape, aperture size, and aperture orientation were tested statically to establish the load/deflection and energy absorbing characteristics of such combinations when subjected to loads beyond the elastic limit. Support members 45 and 50 of the seat pan in FIG. 1 were located at a distance of 16.0 inches from centerline to centerline. The seat pan 60 was attached to support members 45, 50 as shown in FIGS. 2 and 4. In order to represent expected conditions of use, the seat pans were covered with various combinations of polyurethane and polyethelene foam. Tests were conducted using an anthropometric loading shape to represent the loads exerted by a human torso.

The static tests indicated that there were two preferred combinations of parameters that provided the desired load/deflection characteristics. In both cases, the seat pan was fabricated from 1004/1006 expanded low carbon steel. The thickness of the material was 0.034 inch and the opening size of the expanded metal was 0.40 inch (short way of opening) by 0.80 inch (long way of opening). The width of the pan was 15.0 inches. In the first test case, the orientation of the apertures mesh was with the long way of opening in the direction of the supporting structure. In the second test case, the orientation of the apertures was with the short way of opening in the direction of the supporting structure.

Dynamic tests of the seat pan and support structure were performed on an impact sled at the Federal Aviation Administration Aeromedical Center in Oklahoma City, Okla., under conditions meeting the testing requirements of Part 23 of 14 CFR. The anthropometric dummy used for the tests represented a 50 percentile male and was fitted with load measuring devices to record spinal loads. Both aperture orientations were tested. The seat pan configured according to the second test case, with the short way of opening running in the direction of the supporting points, was found to be successful in meeting the 14 CFR requirements when the width of the seat pan was tapered from 15.0 inches at the rear support member 50 to 10.0 inches at the forward support member 45. This preferred embodiment as described above is shown in FIG. 7*b*. Tests of the orientation of the first test case confirmed that the dynamic response characteristics of the seat pan could be varied by the selection of aperture orientations, as well as the other design parameters noted above.

Actual deformation mechanics on a microstructural or finite element analysis of this energy-absorbing structure are extremely detailed and complex. It should be recognized that the disclosed invention encompasses all possible configurations of slitted metal and deformation mechanics. While only a preferred embodiment has been illustrated and described, obvious modifications may be made within the scope of this invention and the claims without substantially changing its functions. Accordingly, the scope of the invention should be determined not by the embodiments illustrated but by the appended claims and their legal equivalents.

The invention claimed is:

1. An energy absorbing structure adapted to decelerate an object impacting said structure and prevent the impacting object from further impacting a basal surface, said structure comprising a shaped sheet of expanded metal, said sheet having an incident surface that meets the impacting object and a perimeter, said sheet being held along said perimeter and positioned in spaced relation to the basal surface by a rigid support means so as to maximize energy absorption for the distance between said incident surface and the basal surface, said sheet of expanded metal having a stranded structure formed as an array of intersecting strands and cross strands interconnected at each point of intersection to define a plurality of apertures between said strands and said cross strands, at least one of said strands and said cross strands being constrained at its ends by said support means, said apertures oriented parallel to said incident surface and either expanding or contracting when a load exerted upon said incident surface by the impacting object places in tension said constrained strands and said constrained cross strands.

2. An energy-absorbing structure as described in claim 1, wherein said shaped sheet of expanded metal is a trapezoid and having two said support points, said support points being each of the two parallel sides of said trapezoid.

3. The energy absorbing structure described in claim 1, wherein shaped sheet has a plastic deformation threshold value, said threshold value chosen so that said sheet elastically absorbs the impacting force when the impacting force is less in magnitude than said threshold value and said sheet plastically deforms when the impacting force is greater in magnitude than said threshold value.

4. The energy absorbing structure described in claim 1, wherein said sheet of expanded metal is formed as a seat pan.

5. The energy absorbing structure described in claim 4, wherein said seat pan is a component of an aircraft seat.

6. The energy absorbing structure in claim 1 wherein the seating means is an aircraft seat.

7. The energy absorbing structure of claim 1, wherein said perimeter comprises a plurality of pairs of opposed sides, and a pair of opposed sides is fixedly attached to said rigid support means at a plurality of points along said pair of opposed sides.

8. The energy absorbing structure of claim 1, further comprising a threshold value selected so that said stranded structure expands within a distance between said incident surface and said basal surface when said force exceeds said threshold in magnitude and so that said stranded structure elastically maintains a configuration maintained prior to application of said force when said threshold exceeds said force in magnitude.

9. The energy absorbing structure of claim 1, further comprising a plastic deformation threshold value chosen so that said sheet elastically absorbs said impacting force when said impacting force is less in magnitude than said threshold value and said sheet plastically deforms when said impacting force is greater in magnitude than said threshold value.

10. An energy-absorbing structure adapted for use in an aircraft seat to provide support to a torso of a seated human being in an aircraft having a cabin floor, the torso being subjected to a sudden load by an external force, said structure comprising:

a. shaped sheet of expanded metal having a stranded structure formed thereby as an array of intersecting strands and cross strands interconnected at their respective points of intersection to define a plurality of apertures between said strands and said cross strands, said sheet having an incident surface upon which the seated human rests and a perimeter said apertures oriented substantially parallel to the incident surface, at least one of said strands and said cross strands being constrained at its ends at a plurality of points at said perimeter; and b. a support means providing rigid support at said support points, said support means constraining said strands and said cross strands having endpoints at said support points, said support means positioning said sheet in spaced relation to the cabin floor;

whereby said apertures plastically deform when the load exerted upon said incident surface by the human torso subjected to the external force places said constrained strands and said cross strands in tension and said sheet of expanded metal expands as a unit towards the cabin floor.

11. The energy absorbing structure described in claim 10, wherein said shaped sheet of expanded metal is configured as having a predetermined threshold value such that said sheet elastically absorbs an incident force less in magnitude than said threshold value is applied to said incident surface and said sheet plastically deforms when the incident force greater in magnitude than said threshold value is applied to said incident surface, whereby energy absorption is maximized for the distance between said incident surface and the cabin floor.

12. The energy absorbing structure described in claim 10, wherein said support means is rigid.

13. An energy absorbing structure adapted to decelerate an object impacting said structure and prevent the impacting object from further impacting a basal surface, said structure comprising a sheet of slitted material, said sheet having an incident surface that meets the impacting object and a perimeter, said sheet being held along said perimeter and positioned in spaced relation to the basal surface by a rigid support means, said sheet having a stranded structure formed as an array of intersecting strands and cross strands interconnected at each point of intersection to form apertures within said sheet, said apertures being oriented substantially parallel to said incident surface, at least one of said strands and said cross strands being constrained at its endpoints where said endpoints intersect said perimeter, the impacting object loading said incident surface so that said constrained strands and said constrained cross strands are placed in tension and a sufficient number deform in response to the loading so as to absorb the energy of the impacting object.

14. The energy absorbing structure described in claim 13, wherein said sheet of slitted material, said support points, and said constrained strands and said constrained cross strands are selected so that said structure has a threshold value such that said sheet elastically absorbs an incident force less in magnitude than said threshold value and said sheet plastically deforms when the incident force is greater in magnitude than said threshold value.

15. The energy absorbing structure described in claim 13, wherein said perimeter of said sheet consists of three or more straight edges.

16. The energy absorbing structure described in claim 13, wherein said sheet of slitted material is expanded metal.

17. The energy absorbing structure described in claim 13, wherein said sheet is shaped as a trapezoid.

18. The energy absorbing structure described in claim 13, wherein said sheet is formed as a seat pan.

19. The energy absorbing structure described in claim 18, wherein said seat pan is contained in an aircraft seat.

20. An energy absorbing structure comprising:
  a. a shaped sheet of expanded metal, said sheet having an incident surface upon which an impacting object exerts a force, said sheet having a perimeter, said sheet having a stranded structure formed as an array of intersecting strands and cross strands interconnected at each point of intersection to define a plurality of apertures between said strands and said cross strands, at least one of said strands and said cross strands being constrained at its ends, said apertures oriented substantially parallel to the incident surface, said apertures plastically deforming when a load exerted upon said incident surface by said impacting object places in tension said constrained strands and said constrained cross strands; and,
  b. a rigid support means provided to position said sheet in spaced relation to a basal surface, said support means contacting said sheet along a plurality of points of said perimeter and providing constraint for said at least one of said strands and said cross strands.

* * * * *